US012581381B2

(12) United States Patent
Wen et al.

(10) Patent No.: US 12,581,381 B2
(45) Date of Patent: Mar. 17, 2026

(54) COMMUNICATION METHOD AND APPARATUS

(71) Applicant: HUAWEI TECHNOLOGIES CO., LTD., Shenzhen (CN)

(72) Inventors: Ronghui Wen, Beijing (CN); Zheng Yu, Beijing (CN); Zhe Jin, Beijing (CN); Xi Xie, Beijing (CN); Hailong Hou, Beijing (CN); Jiaojiao Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 441 days.

(21) Appl. No.: 18/162,420

(22) Filed: Jan. 31, 2023

(65) Prior Publication Data

US 2023/0171658 A1 Jun. 1, 2023

Related U.S. Application Data

(63) Continuation of application No. PCT/CN2022/118100, filed on Sep. 9, 2022.

(30) Foreign Application Priority Data

Nov. 5, 2021 (CN) .......................... 202111307503.X

(51) Int. Cl.
*H04W 36/06* (2009.01)
*H04B 7/06* (2006.01)
(Continued)

(52) U.S. Cl.
CPC .......... *H04W 36/06* (2013.01); *H04B 7/0639* (2013.01); *H04L 5/0073* (2013.01);
(Continued)

(58) Field of Classification Search
CPC ... H04W 36/06; H04W 24/10; H04W 72/046; H04B 7/0639; H04L 5/0073
See application file for complete search history.

(56) References Cited

U.S. PATENT DOCUMENTS 12,047,960 B2* 7/2024 Harada ................. H04L 5/0048
2019/0357291 A1* 11/2019 Zhou ..................... H04W 76/19
(Continued)

FOREIGN PATENT DOCUMENTS

CN 109391965 A 2/2019
CN 110519793 A 11/2019
(Continued)

OTHER PUBLICATIONS

Nokia, Nokia Shanghai Bell, "On Enhancements to Initial Access Procedures for NR-U," 3GPP TSG RAN WG1 Meeting #98, Prague, Czech Republic, R1-1908736, total 21 pages, 3rd Generation Partnership Project, Valbonne, France (Aug. 26-30, 2019).
(Continued)

*Primary Examiner* — Fahmida S Chowdhury
(74) *Attorney, Agent, or Firm* — Leydig, Voit & Mayer, Ltd.

(57) ABSTRACT

A communication method and apparatus are provided, which relate to the field of communication technologies, to improve communication performance of a terminal device and improve resource utilization of a communication system. The method includes: a terminal device receives measurement information from a network device, where the measurement information indicates one or more measurement objects, and the measurement information includes one or more of the following: information about a measurement object of a serving cell, information about intra-frequency measurement of a neighboring cell, and information about inter-frequency measurement of a neighboring cell; and the terminal device performs, based on a reference signal asso-
(Continued)

ciated with one or more measurement objects corresponding to a first bandwidth part (BWP), one or more of the following measurements: radio resource management (RRM) measurement, radio link monitoring (RLM) measurement, and beam failure recovery (BFR) measurement.

21 Claims, 3 Drawing Sheets

(51) Int. Cl.

| | | |
|---|---|---|
| *H04L 5/00* | (2006.01) | |
| *H04W 24/10* | (2009.01) | |
| *H04W 72/044* | (2023.01) | |
| *H04W 76/18* | (2018.01) | |

(52) U.S. Cl.
     CPC ......... *H04W 24/10* (2013.01); *H04W 72/046* (2013.01); *H04W 76/18* (2018.02)

(56) References Cited

U.S. PATENT DOCUMENTS

| | | | | |
|---|---|---|---|---|
| 2020/0053811 | A1* | 2/2020 | Ang | H04L 5/001 |
| 2020/0092018 | A1* | 3/2020 | Hwang | H04W 24/08 |
| 2020/0169340 | A1 | 5/2020 | Hwang et al. | |
| 2020/0274679 | A1* | 8/2020 | Futaki | H04L 5/0092 |
| 2021/0076240 | A1 | 3/2021 | Koziol et al. | |
| 2021/0204231 | A1* | 7/2021 | Harada | H04L 5/0048 |
| 2023/0042400 | A1* | 2/2023 | Gursu | H04W 56/001 |
| 2023/0171658 | A1* | 6/2023 | Wen | H04W 72/046 |
| 2023/0345532 | A1* | 10/2023 | Khirallah | H04W 74/0816 |
| 2023/0388089 | A1* | 11/2023 | Kwak | H04W 72/04 |
| 2024/0224322 | A1* | 7/2024 | He | H04L 5/0091 |

FOREIGN PATENT DOCUMENTS

| | | |
|---|---|---|
| CN | 110661600 A | 1/2020 |
| CN | 110913422 A | 3/2020 |
| CN | 111263393 A | 6/2020 |
| CN | 111567080 A | 8/2020 |
| CN | 111818564 A | 10/2020 |
| CN | 112219422 A | 1/2021 |
| CN | 113453288 A | 9/2021 |
| CN | 113473517 A | 10/2021 |

OTHER PUBLICATIONS

Qualcomm Incorporated, "Use of NCD-SSB for Reduced Capability UE," 3GPP TSG-RAN WG4 Meeting #100-e, Electronic Meeting, R4-2119559, total 9 pages, 3rd Generation Partnership Project, Valbonne, France (Nov. 1-12, 2021).

Apple, "Making ND-SSB work for RedCap in Rel-17," 3GPP TSG-RAN WG2 Meeting #116-e, Electronic, R2-2110095, total 9 pages, 3rd Generation Partnership Project, Valbonne, France (Nov. 1-12, 2021).

Huawei, HiSilicon, "On RedCap UE RF retuning," 3GPP TSG RAN WG1 Meeting #106b-e, e-Meeting, R1-2109752, total 8 pages, 3rd Generation Partnership Project, Valbonne, France (Oct. 11-19, 2021).

Moderator (Ericsson), "FL summary #5 on reduced maximum UE bandwidth for RedCap," 3GPP TSG-RAN WG1 Meeting #106bis-e, e-Meeting, R1-2110381, total 18 pages, 3rd Generation Partnership Project, Valbonne, France (Oct. 11-19, 2021).

"Considerations on use of NCD-SSB instead of CD-SSB for RedCap UE," 3GPP TSG-RAN WG4 Meeting #101-e, Electronic Meeting, Total 8 pages (Nov. 1-12, 2021).

"3rd Generation Partnership Project;Technical Specification Group Radio Access Network; NR; Requirements for support of radio resource management (Release 17)," 3GPP TS 38.133 V17.3.0, Total 3209 pages, 3rd Generation Partnership Project, Valbonne, France (Sep. 2021).

"3rd Generation Partnership Project; Technical Specification Group Radio Access Network; NR; NR and NG-RAN Overall Description; Stage 2 (Release 16)," 3GPP TS 38.300 V16.7.0, Total 152 pages, 3rd Generation Partnership Project, Valbonne, France (Sep. 2021).

"3rd Generation Partnership Project; Technical Specification Group Radio Access Network; NR; Radio Resource Control (RRC) protocol specification (Release 16)," 3GPP TS 38.331 V16.6.0, Total 961 pages, 3rd Generation Partnership Project, Valbonne, France (Sep. 2019).

CMCC, "Discussion on reduced maximum UE bandwidth," 3GPP TSG RAN WG1 #106-e, e-Meeting, R1-2107408, Total 6 pages, 3rd Generation Partnership Project, Valbonne, France (Aug. 16-27, 2021).

Qualcomm Incorporated, "NCD-SSB and RedCap-specific BWPs," 3GPP TSG-RAN WG2 Meeting #116-e, Online, R2-2109451, Total 6 pages, 3rd Generation Partnership Project, Valbonne, France (Nov. 1-12, 2021).

Ericsson, "Use of NCD-SSB instead of CD-SSB for RedCap UEs," eg3GPP TSG-RAN WG2 #116-e, Electronic meeting, Tdoc R2-2110773, Total 7 pages, 3rd Generation Partnership Project, Valbonne, France (Nov. 1-12, 2021).

* cited by examiner

COMMUNICATION METHOD AND APPARATUS

CROSS-REFERENCE TO RELATED APPLICATIONS

This application is a continuation of International Application No. PCT/CN2022/118100, filed on Sep. 9, 2022, which claims priority to Chinese Patent Application No. 202111307503.X, filed on Nov. 5, 2021. The disclosures of the aforementioned applications are hereby incorporated by reference in their entireties.

TECHNICAL FIELD

Embodiments of this application relate to the field of communication technologies, and in particular, to a communication method and apparatus.

BACKGROUND

In a communication system, a network device may configure a bandwidth part (BWP) for a terminal device based on a bandwidth capability of the terminal device. For example, for a low-capability terminal device (reduced capability user equipment, RedCap UE), a bandwidth of the BWP configured by the network device for the RedCap UE may not exceed 20 MHz.

Because the terminal device is mobile, a status of a wireless channel between the terminal device and the network device keeps changing. After accessing a serving cell, the terminal device may perform channel measurement, radio link monitoring (RLM) measurement, or beam failure recovery (BFR) measurement of the serving cell in radio resource management (RRM) measurement based on a cell-defined synchronization signal block (cell define synchronization signal block, CD-SSB) of the current serving cell.

If an active BWP configured by the network device for the terminal device includes the CD-SSB, all terminal devices are concentrated in a 20 MHz frequency domain resource including the CD-SSB, causing frequency domain resource load imbalance. If an active BWP configured by the network device for the terminal device does not include the CD-SSB, the terminal device needs to switch, through frequency tuning, to a frequency domain resource on which the CD-SSB is located for measurement, and then returns to the active BWP after the measurement. Consequently, power consumption and complexity of the terminal device increase, and communication may be interrupted.

Therefore, how to improve communication performance of the terminal device and improve resource utilization of a communication system becomes an urgent technical problem to be resolved.

SUMMARY

In view of this, this application provides a communication method and apparatus, to improve communication performance of a terminal device and improve resource utilization of a communication system.

According to a first aspect, an embodiment of this application provides a communication method. The method includes: A terminal device receives measurement information from a network device, where the measurement information indicates one or more measurement objects, and the measurement information includes one or more of the following: information about a measurement object of a serving cell, information about intra-frequency measurement of a neighboring cell, and information about inter-frequency measurement of a neighboring cell; and the terminal device performs, based on a reference signal associated with one or more measurement objects corresponding to a first bandwidth part BWP, one or more of the following measurements: radio resource management RRM measurement, radio link monitoring RLM measurement, and beam failure recovery BFR measurement.

Based on the first aspect, when performing measurement, the terminal device may perform measurement based on the reference signal associated with the one or more measurement objects corresponding to the first BWP. Because a measurement object indicated by the measurement information sent by the network device to the terminal device may be one or more of the following: the information about the measurement object of the serving cell, the information about the intra-frequency measurement of the neighboring cell, or the information about the inter-frequency measurement of the neighboring cell, this can avoid that all terminal devices are concentrated in a 20 MHz frequency domain resource of a CD-SSB, thereby balancing frequency domain resource load. The terminal device may perform measurement based on the reference signal associated with the one or more measurement objects corresponding to the first BWP, so that when the first BWP does not include the CD-SSB, the terminal device does not need to switch to a frequency domain resource on which the CD-SSB is located for measurement, and then switch to the first BWP. This can reduce power consumption and complexity of the terminal device, improve communication performance of the terminal device, and improve resource utilization of a communication system.

In a possible design, when the terminal device is in a connected mode, the first BWP is an active BWP; or when the terminal device is in a non-connected mode, the first BWP is a BWP on which the terminal device camps.

Based on this possible design, when the terminal device is in the connected mode, the first BWP is the active BWP; or when the terminal device is in the non-connected mode, the first BWP is the BWP on which the terminal device camps. This provides a feasible solution for the terminal device to perform measurement based on the reference signal associated with the one or more measurement objects corresponding to the first BWP.

In a possible design, the reference signal includes one or more of the following: a cell-defined synchronization signal block CD-SSB, a non-cell-defined synchronization signal block NCD-SSB, and channel state information CSI-RS.

Based on this possible design, the reference signal associated with the measurement object may be the CD-SSB, the NCD-SSB, or the CSI-RS. In this embodiment of this application, measurement performed by using a measurement object associated with the NCD-SSB is introduced, and how the terminal device determines the measurement object and the reference signal is specified, so that a case in which measurement information needs to be frequently reconfigured can be avoided.

In a possible design, different BWPs correspond to different measurement objects.

Based on this possible design, the network device may configure a corresponding measurement object for each BWP. When the BWP is an active BWP, the terminal device may perform measurement based on the measurement object corresponding to the BWP.

In a possible design, the measurement information is carried in configuration information of a BWP; or the measurement information is carried in configuration information of the serving cell.

Based on this possible design, the measurement information may be located in the configuration information of the BWP, and the terminal device may determine, based on received configuration information of the BWP, the measurement object corresponding to the BWP. Alternatively, the measurement information may be located in the configuration information of the serving cell, and the terminal device may determine the measurement object based on the configuration information of the serving cell, and further determine, based on the BWP, the measurement object corresponding to the BWP.

In a possible design, the measurement information is carried in the configuration information of the serving cell, and the measurement information includes a plurality of pieces of measurement information; and a frequency domain resource of the reference signal associated with the measurement object corresponding to the first BWP is the same as a frequency domain resource of the first BWP; or a frequency domain resource of the reference signal associated with the measurement object corresponding to the first BWP falls within a frequency domain resource range of the first BWP.

Based on this possible design, the terminal device may determine, based on the frequency domain resource of the first BWP, the measurement object corresponding to the first BWP. This provides a feasible solution for the terminal device to determine the measurement object of the BWP.

In a possible design, the terminal device receives first signaling from the network device, where the first signaling indicates to perform measurement based on the reference signal associated with the one or more measurement objects corresponding to the first BWP, and the first signaling is downlink control information DCI or media access control control element MAC CE signaling.

Based on this possible design, the terminal device may determine, based on the first signaling sent by the network device, to perform measurement based on the reference signal associated with the one or more measurement objects corresponding to the first BWP. This provides a feasible solution for the terminal device to perform measurement.

In a possible design, the terminal device determines the information about the intra-frequency measurement of the neighboring cell based on the measurement information, where a frequency of a reference signal associated with the intra-frequency measurement is the same as a frequency of a first reference signal, and the first reference signal is a reference signal associated with a measurement object of a serving cell in the first BWP; or a frequency of a reference signal associated with the intra-frequency measurement is the same as a frequency of a second reference signal, and the second reference signal is a reference signal associated with a measurement object of a serving cell of the terminal device.

Based on this possible design, the terminal device may further determine the information about the intra-frequency measurement of the neighboring cell based on the first reference signal or the second reference signal. This provides a feasible solution for the terminal device to perform intra-frequency measurement.

In a possible design, the measurement information further includes one or more of the following: identification information mation of a serving cell of the measurement object and identification information of a neighboring cell of the measurement object.

Based on this possible design, the network device indicates, in the measurement information, the identification information of the serving cell of the measurement object or the identification information of the neighboring cell of the measurement object, so that the terminal device can determine, based on the identification information of the cell of the measurement object, whether the current measurement object is the measurement object of the serving cell or the measurement object of the neighboring cell.

In a possible design, a quantity of measurement objects is less than or equal to a quantity of BWPs configured by the network device for the terminal device.

In a possible design, the RRM measurement comprises intra-frequency measurement and inter-frequency measurement, and a sum of quantities of frequencies corresponding to the intra-frequency measurement and the inter-frequency measurement that are supported by the terminal device is greater than 8.

In a possible design, a quantity of frequencies supported by the terminal device in a first measurement period is less than or equal to 8, frequencies supported by the terminal device in different first measurement periods are different, and the first measurement period is a smallest value in measurement periods corresponding to one or more measurement objects.

Based on the foregoing two possible designs, a total quantity of frequencies corresponding to the intra-frequency measurement and the inter-frequency measurement that are supported by the terminal device is increased, so that after the NCD-SSB is introduced, network service quality is not affected due to a limited quantity of frequencies for measurement, or measurement load of the terminal device is not excessively heavy.

In a possible design, a measurement period of an NCD-SSB of the serving cell is greater than or equal to a measurement period of a CD-SSB of the serving cell.

Based on this possible design, occupied resources are not excessive, and measurement load of the terminal device is not increased.

In a possible design, the terminal device sends first indication information to the network device, where the first indication information indicates whether the terminal device supports to perform the RRM measurement, the RLM measurement, or the BFR measurement based on the NCD-SSB.

Based on this possible design, if the terminal device supports the RRM measurement, the RLM measurement, or the BFR measurement based on the NCD-SSB, when configuring a measurement object for the terminal device, the network device may configure the measurement object associated with the NCD-SSB.

In a possible design, the terminal device sends second indication information to the network device, where the second indication information indicates a maximum value of a quantity of frequencies supported by the terminal device, and the maximum value is greater than 8.

Based on this possible design, a total quantity of frequencies supported by the terminal device is increased, so that after the NCD-SSB is introduced, network service quality is not affected due to a limited quantity of frequencies for measurement, or measurement load of the terminal device is not excessively heavy.

In a possible design, the terminal device reports a measurement result to the network device, where the measurement result is a measurement result obtained by the terminal device by performing one or more of the following measurements based on the reference signal associated with the one or more measurement objects corresponding to the first BWP: radio resource management RRM measurement, radio link monitoring RLM measurement, and beam failure recovery BFR measurement.

According to a second aspect, an embodiment of this application provides a communication apparatus. The communication apparatus may implement functions performed by the terminal device in the first aspect or the possible designs of the first aspect, and the functions may be implemented by hardware executing corresponding software. The hardware or the software includes one or more modules corresponding to the functions, for example, a transceiver module and a processing module. The transceiver module may be configured to receive measurement information from a network device, where the measurement information indicates one or more measurement objects, and the measurement information includes one or more of the following: information about a measurement object of a serving cell, information about intra-frequency measurement of a neighboring cell, and information about inter-frequency measurement of a neighboring cell; and the processing module may be configured to perform, based on a reference signal associated with one or more measurement objects corresponding to a first bandwidth part BWP, one or more of the following measurements: radio resource management RRM measurement, radio link monitoring RLM measurement, and beam failure recovery BFR measurement.

In a possible design, when the terminal device is in a connected mode, the first BWP is an active BWP; or when the terminal device is in a non-connected mode, the first BWP is a BWP on which the terminal device camps.

In a possible design, the reference signal includes one or more of the following: a cell-defined synchronization signal block CD-SSB, a non-cell-defined synchronization signal; block NCD-SSB, and channel state information CSI-RS.

In a possible design, different BWPs correspond to different measurement objects.

In a possible design, the measurement information is carried in configuration information of a BWP; or the measurement information is carried in configuration information of the serving cell.

In a possible design, the measurement information is carried in the configuration information of the serving cell, and the measurement information includes a plurality of pieces of measurement information; and a frequency domain resource of the reference signal associated with the measurement object corresponding to the first BWP is the same as a frequency domain resource of the first BWP; or a frequency domain resource of the reference signal associated with the measurement object corresponding to the first BWP falls within a frequency domain resource range of the first BWP.

In a possible design, the transceiver module is further configured to receive first signaling from the network device, where the first signaling indicates to perform measurement based on the reference signal associated with the one or more measurement objects corresponding to the first BWP, and the first signaling is downlink control information DCI or media access control control element MAC CE signaling.

In a possible design, the processing module is further configured to determine the information about the intra-frequency measurement of the neighboring cell based on the measurement information, where a frequency of a reference signal associated with the intra-frequency measurement is the same as a frequency of a first reference signal, and the first reference signal is a reference signal associated with a measurement object of a serving cell in the first BWP; or a frequency of a reference signal associated with the intra-frequency measurement is the same as a frequency of a second reference signal, and the second reference signal is a reference signal associated with a measurement object of a serving cell of the terminal device.

In a possible design, the measurement information further includes one or more of the following: identification information of a serving cell of the measurement object and identification information of a neighboring cell of the measurement object.

In a possible design, a quantity of measurement objects is less than or equal to a quantity of BWPs configured by the network device for the terminal device.

In a possible design, the RRM measurement comprises intra-frequency measurement and inter-frequency measurement, and a sum of quantities of frequencies corresponding to the intra-frequency measurement and the inter-frequency measurement that are supported by the terminal device is greater than 8.

In a possible design, a quantity of frequencies supported by the terminal device in a first measurement period is less than or equal to 8, frequencies supported by the terminal device in different first measurement periods are different, and the first measurement period is a smallest value in measurement periods corresponding to one or more measurement objects.

In a possible design, a measurement period of an NCD-SSB of the serving cell is greater than or equal to a measurement period of a CD-SSB of the serving cell.

In a possible design, the transceiver module is further configured to send first indication information to the network device, where the first indication information indicates whether the terminal device supports to perform the RRM measurement, the RLM measurement, or the BFR measurement based on the NCD-SSB.

In a possible design, the transceiver module is further configured to send second indication information to the network device, where the second indication information indicates a maximum value of a quantity of frequencies supported by the terminal device, and the maximum value is greater than 8.

In a possible design, the transceiver module is further configured to report a measurement result to the network device, where the measurement result is a measurement result obtained by the terminal device by performing one or more of the following measurements based on the reference signal associated with the one or more measurement objects corresponding to the first BWP: radio resource management RRM measurement, radio link monitoring RLM measurement, and beam failure recovery BFR measurement.

It should be noted that for a specific implementation of the communication apparatus in the second aspect, refer to behavior functions of the terminal device in the communication method provided in any one of the first aspect or the possible designs of the first aspect.

According to a third aspect, an embodiment of this application provides a communication apparatus. The communication apparatus may be a terminal device, or a chip or a system-on-a-chip in the terminal device. The communication apparatus may implement a function performed by the terminal device in the foregoing aspects or the possible designs, and the function may be implemented by hardware. In a possible design, the communication apparatus may include a transceiver and a processor. The transceiver and the processor may be configured to support the communication apparatus to implement the function in any one of the first aspect or the possible designs of the first aspect. For example, the transceiver may be configured to receive measurement information from a network device, where the measurement information indicates one or more measurement objects, and the measurement information includes one or more of the following: information about a measurement object of a serving cell, information about intra-frequency measurement of a neighboring cell, and information about inter-frequency measurement of a neighboring cell; and the processor may be configured to perform, based on a reference signal associated with one or more measurement objects corresponding to a first bandwidth part BWP, one or more of the following measurements: radio resource management RRM measurement, radio link monitoring RLM measurement, and beam failure recovery BFR measurement. In another possible design, the communication apparatus may further include a memory. The memory is configured to store computer-executable instructions and data that are necessary for the communication apparatus. When the communication apparatus runs, the transceiver and the processor execute the computer-executable instructions stored in the memory, so that the communication apparatus performs the communication method in any one of the first aspect or the possible designs of the first aspect.

For a specific implementation of the communication apparatus in the third aspect, refer to behavior functions of the terminal device in the communication method provided in any one of the first aspect or the possible designs of the first aspect.

According to a fourth aspect, an embodiment of this application provides a communication method. The method may include: A network device sends measurement information to a terminal device, where the measurement information indicates one or more measurement objects, and the measurement information includes one or more of the following: information about a measurement object of a serving cell, information about intra-frequency measurement of a neighboring cell, and information about inter-frequency measurement of a neighboring cell; and the network device receives a measurement result from the terminal device, where the measurement result is a measurement result obtained by the terminal device by performing one or more of the following measurements based on a reference signal associated with one or more measurement objects corresponding to a first bandwidth part BWP: radio resource management RRM measurement, radio link monitoring RLM measurement, and beam failure recovery BFR measurement.

Based on the fourth aspect, when performing measurement, the terminal device may perform measurement based on the reference signal associated with the one or more measurement objects corresponding to the first BWP. Because a measurement object indicated by the measurement information sent by the network device to the terminal device may be one or more of the following: the information about the measurement object of the serving cell, the information about the intra-frequency measurement of the neighboring cell, or the information about the inter-frequency measurement of the neighboring cell, this can avoid that all terminal devices are concentrated in a 20 MHz frequency domain resource of a CD-SSB, thereby balancing frequency domain resource load. The terminal device may perform measurement based on the reference signal associated with the one or more measurement objects corresponding to the first BWP, so that when the first BWP does not include the CD-SSB, the terminal device does not need to switch to a frequency domain resource on which the CD-SSB is located for measurement, and then switch to the first BWP. This can reduce power consumption and complexity of the terminal device and improve communication performance.

In a possible design, when the terminal device is in a connected mode, the first BWP is an active BWP; or when the terminal device is in a non-connected mode, the first BWP is a BWP on which the terminal device camps.

Based on this possible design, when the terminal device is in the connected mode, the first BWP is the active BWP; or when the terminal device is in the non-connected mode, the first BWP is the BWP on which the terminal device camps. This provides a feasible solution for the terminal device to perform measurement based on the reference signal associated with the one or more measurement objects corresponding to the first BWP.

In a possible design, the reference signal includes one or more of the following: a cell-defined synchronization signal block CD-SSB, a non-cell-defined synchronization signal block NCD-SSB, and channel state information CSI-RS.

Based on this possible design, the reference signal associated with the measurement object may be the CD-SSB, the NCD-SSB, or the CSI-RS. In this embodiment of this application, measurement performed by using a measurement object associated with the NCD-SSB is introduced, and how the terminal device determines the measurement object and the reference signal is specified, so that a case in which measurement information needs to be frequently reconfigured can be avoided.

In a possible design, different BWPs correspond to different measurement objects.

Based on this possible design, the network device may configure a corresponding measurement object for each BWP. When the BWP is an active BWP, the terminal device may perform measurement based on the measurement object corresponding to the BWP.

In a possible design, the measurement information is carried in configuration information of a BWP; or the measurement information is carried in configuration information of the serving cell.

Based on this possible design, the measurement information may be located in the configuration information of the BWP, and the terminal device may determine, based on received configuration information of the BWP, the measurement object corresponding to the BWP. Alternatively, the measurement information may be located in the configuration information of the serving cell, and the terminal device may determine the measurement object based on the configuration information of the serving cell, and further determine, based on the BWP, the measurement object corresponding to the BWP.

In a possible design, the measurement information is carried in the configuration information of the serving cell, and the measurement information includes a plurality of pieces of measurement information; and a frequency domain resource of the reference signal associated with the measurement object corresponding to the first BWP is the same as a frequency domain resource of the first BWP; or a frequency domain resource of the reference signal associated with the measurement object corresponding to the first BWP falls within a frequency domain resource range of the first BWP.

Based on this possible design, the terminal device may determine, based on the frequency domain resource of the first BWP, the measurement object corresponding to the first BWP. This provides a feasible solution for the terminal device to determine the measurement object of the BWP.

In a possible design, the network device sends first signaling to the terminal device, where the first signaling indicates the first BWP, and the first signaling is downlink control information DCI or media access control control element MAC CE signaling.

Based on this possible design, the terminal device may determine, based on the first signaling sent by the network device, to perform measurement based on the reference signal associated with the one or more measurement objects corresponding to the first BWP. This provides a feasible solution for the terminal device to perform measurement.

In a possible design, a frequency of a reference signal associated with the intra-frequency measurement is the same as a frequency of a first reference signal, and the first reference signal is a reference signal associated with a measurement object of a serving cell in the first BWP; or a frequency of a reference signal associated with the intra-frequency measurement is the same as a frequency of a second reference signal, and the second reference signal is a reference signal associated with a measurement object of a serving cell of the terminal device.

Based on this possible design, the terminal device may further determine the information about the intra-frequency measurement of the neighboring cell based on the first reference signal or the second reference signal. This provides a feasible solution for the terminal device to perform intra-frequency measurement.

In a possible design, the measurement information further includes one or more of the following: identification information of a serving cell of the measurement object and identification information of a neighboring cell of the measurement object.

Based on this possible design, the network device indicates, in the measurement information, the identification information of the serving cell of the measurement object or the identification information of the neighboring cell of the measurement object, so that the terminal device can determine, based on the identification information of the cell of the measurement object, whether the current measurement object is the measurement object of the serving cell or the measurement object of the neighboring cell.

In a possible design, a quantity of measurement objects is less than or equal to a quantity of BWPs configured by the network device for the terminal device.

In a possible design, a measurement period of an NCD-SSB of the serving cell is greater than or equal to a measurement period of a CD-SSB of the serving cell.

Based on this possible design, occupied resources are not excessive, and measurement load of the terminal device is not increased.

In a possible design, the network device receives first indication information from the terminal device, where the first indication information indicates whether the terminal device supports to perform the RRM measurement, the RLM measurement, or the BFR measurement based on the NCD-SSB.

Based on this possible design, if the terminal device supports the RRM measurement, the RLM measurement, or the BFR measurement based on the NCD-SSB, when configuring a measurement object for the terminal device, the network device may configure the measurement object associated with the NCD-SSB.

In a possible design, the network device receives second indication information from the terminal device, where the second indication information indicates a maximum value of a quantity of frequencies supported by the terminal device, and the maximum value is greater than 8.

Based on this possible design, a total quantity of frequencies supported by the terminal device is increased, so that after the NCD-SSB is introduced, network service quality is not affected due to a limited quantity of frequencies for measurement, or measurement load of the terminal device is not excessively heavy.

According to a fifth aspect, an embodiment of this application provides a communication apparatus. The communication apparatus may implement functions performed by the network device in the fourth aspect or the possible designs of the fourth aspect, and the functions may be implemented by hardware executing corresponding software. The hardware or the software includes one or more modules corresponding to the functions, for example, a processing module and a transceiver module. The processing module is configured to determine measurement information. The transceiver module is configured to send measurement information to a terminal device, where the measurement information indicates one or more measurement objects, and the measurement information includes one or more of the following: information about a measurement object of a serving cell, information about intra-frequency measurement of a neighboring cell, and information about inter-frequency measurement of a neighboring cell. The transceiver module is further configured to receive a measurement result from the terminal device, where the measurement result is a measurement result obtained by the terminal device by performing one or more of the following measurements based on a reference signal associated with one or more measurement objects corresponding to a first bandwidth part BWP: radio resource management RRM measurement, radio link monitoring RLM measurement, and beam failure recovery BFR measurement.

In a possible design, when the terminal device is in a connected mode, the first BWP is an active BWP; or when the terminal device is in a non-connected mode, the first BWP is a BWP on which the terminal device camps.

In a possible design, the reference signal includes one or more of the following: a cell-defined synchronization signal block CD-SSB, a non-cell-defined synchronization signal block NCD-SSB, and channel state information CSI-RS.

In a possible design, different BWPs correspond to different measurement objects.

In a possible design, the measurement information is carried in configuration information of a BWP; or the measurement information is carried in configuration information of the serving cell.

In a possible design, the measurement information is carried in the configuration information of the serving cell, and the measurement information includes a plurality of pieces of measurement information; and a frequency domain resource of the reference signal associated with the measurement object corresponding to the first BWP is the same as a frequency domain resource of the first BWP; or a frequency domain resource of the reference signal associated with the measurement object corresponding to the first BWP falls within a frequency domain resource range of the first BWP.

In a possible design, the transceiver module is further configured to send first signaling to the terminal device, where the first signaling indicates the first BWP, and the first signaling is downlink control information DCI or media access control control element MAC CE signaling.

In a possible design, a frequency of a reference signal associated with the intra-frequency measurement is the same as a frequency of a first reference signal, and the first reference signal is a reference signal associated with a measurement object of a serving cell in the first BWP; or a frequency of a reference signal associated with the intra-frequency measurement is the same as a frequency of a second reference signal, and the second reference signal is a reference signal associated with a measurement object of a serving cell of the terminal device.

In a possible design, the measurement information further includes one or more of the following: identification information of a serving cell of the measurement object and identification information of a neighboring cell of the measurement object.

In a possible design, a quantity of measurement objects is less than or equal to a quantity of BWPs configured by the network device for the terminal device.

In a possible design, a measurement period of an NCD-SSB of the serving cell is greater than or equal to a measurement period of a CD-SSB of the serving cell.

In a possible design, the transceiver module is further configured to receive first indication information from the terminal device, where the first indication information indicates whether the terminal device supports to perform the RRM measurement, the RLM measurement, or the BFR measurement based on the NCD-SSB.

In a possible design, the transceiver module is further configured to receive second indication information from the terminal device, where the second indication information indicates a maximum value of a quantity of frequencies supported by the terminal device, and the maximum value is greater than 8.

It should be noted that for a specific implementation of the communication apparatus in the fifth aspect, refer to behavior functions of the network device in the communication method provided in any one of the fourth aspect or the possible designs of the fourth aspect.

According to a sixth aspect, an embodiment of this application provides a communication apparatus. The communication apparatus may be a network device, or a chip or a system-on-a-chip in the network device. The communication apparatus may implement a function performed by the network device in the foregoing aspects or the possible designs, and the function may be implemented by hardware. In a possible design, the communication apparatus may include a transceiver and a processor. The transceiver and the processor may be configured to support the communication apparatus to implement the function in any one of the fourth aspect or the possible designs of the fourth aspect. For example, the processor may be configured to determine measurement information. The transceiver may be configured to send measurement information to a terminal device, where the measurement information indicates one or more measurement objects, and the measurement information includes one or more of the following: information about a measurement object of a serving cell, information about intra-frequency measurement of a neighboring cell, and information about inter-frequency measurement of a neighboring cell. The transceiver is further configured to receive a measurement result from the terminal device, where the measurement result is a measurement result obtained by the terminal device by performing one or more of the following measurements based on a reference signal associated with one or more measurement objects corresponding to a first bandwidth part BWP: radio resource management RRM measurement, radio link monitoring RLM measurement, and beam failure recovery BFR measurement. In another possible design, the communication apparatus may further include a memory. The memory is configured to store computer-executable instructions and data that are necessary for the communication apparatus. When the communication apparatus runs, the transceiver and the processor execute the computer-executable instructions stored in the memory, so that the communication apparatus performs the communication method in any one of the fourth aspect or the possible designs of the fourth aspect.

For a specific implementation of the communication apparatus in the sixth aspect, refer to behavior functions of the network device in the communication method provided in any one of the fourth aspect or the possible designs of the fourth aspect.

According to a seventh aspect, a communication apparatus is provided. The communication apparatus includes one or more processors. The one or more processors are configured to run a computer program or instructions. When the one or more processors execute the computer program or the instructions, the communication apparatus is enabled to perform the communication method in any one of the first aspect or the possible designs of the first aspect, or perform the communication method in any one of the fourth aspect or the possible designs of the fourth aspect.

In a possible design, the communication apparatus further includes one or more memories, the one or more memories are coupled to the one or more processors, and the one or more memories are configured to store the foregoing computer program or instructions. In a possible implementation, the memory is located outside the communication apparatus. In another possible implementation, the memory is located inside the communication apparatus. In this embodiment of this application, the processor and the memory may alternatively be integrated into one component. In other words, the processor and the memory may alternatively be integrated together. In a possible implementation, the communication apparatus further includes a transceiver. The transceiver is configured to receive information and/or send information.

In a possible design, the communication apparatus further includes one or more communication interfaces, the one or more communication interfaces are coupled to the one or more processors, and the one or more communication interfaces are configured to communicate with another module other than the communication apparatus.

According to an eighth aspect, a communication apparatus is provided. The communication apparatus includes an input/output interface and a logic circuit. The input/output interface is configured to input and/or output information. The logic circuit is configured to perform the communication method in any one of the first aspect or the possible designs of the first aspect, or perform the communication method in any one of the fourth aspect or the possible designs of the fourth aspect, and perform processing based on information and/or generate information. The information includes measurement information, where the measurement information indicates one or more measurement objects, and the measurement information includes one or more of the following: information about a measurement object of a serving cell, information about intra-frequency measurement of a neighboring cell, and information about inter-frequency measurement of a neighboring cell.

According to a ninth aspect, a computer-readable storage medium is provided. The computer-readable storage medium stores computer instructions or a program, and when the computer instructions or the program are/is run on a computer, the computer is enabled to perform the communication method in any one of the first aspect or the possible designs of the first aspect, or perform the communication method in any one of the fourth aspect or the possible designs of the fourth aspect.

According to a tenth aspect, a computer program product including computer instructions is provided. When the computer program product is run on a computer, the computer is enabled to perform the communication method in any one of the first aspect or the possible designs of the first aspect, or perform the communication method in any one of the fourth aspect or the possible designs of the fourth aspect.

According to an eleventh aspect, an embodiment of this application provides a computer program. When the computer program is run on a computer, the computer is enabled to perform the communication method in any one of the first aspect or the possible designs of the first aspect, or perform the communication method in any one of the fourth aspect or the possible designs of the fourth aspect.

For technical effects brought by any design manner of the seventh aspect to the eleventh aspect, refer to technical effects brought by any possible design of the first aspect, or refer to technical effects brought by any possible design of the fourth aspect.

According to a twelfth aspect, a communication system is provided. The communication system includes the communication apparatus in either of the second aspect and the third aspect, and the communication apparatus in either of the fifth aspect and the sixth aspect.

DESCRIPTION OF EMBODIMENTS

Figure 1:
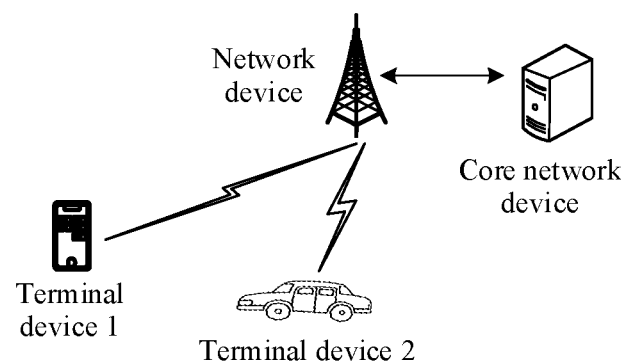
FIG. 1 is a schematic diagram of a communication system according to an embodiment of this application.

Before embodiments of this application are described, technical terms used in embodiments of this application are described.

The fifth generation (5G) mobile communication system: Mobile communication technologies have profoundly changed people's lives, but people's pursuit of mobile communication technologies with higher performance has never stopped. To cope with explosive growth of mobile data traffic, massive mobile communication device connections, and various emerging new services and application scenarios in the future, a 5G communication system emerges. The international telecommunication union (ITU) defines three major kinds of application scenarios for the 5G communication system and a future mobile communication system: enhanced mobile broadband (eMBB), ultra-reliable low-latency communication (URLLC), and massive machine-type communication (massive machine type communication, mMTC).

Low-capability terminal device (reduced capability user equipment, RedCap UE): In the standard, a terminal device of an mMTC service is referred to as the RedCap UE, or may be referred to as a low-complexity terminal device. This type of terminal device may be less complex than another terminal device in terms of bandwidth, power consumption, and a quantity of antennas, for example, narrower bandwidth, lower power consumption, and fewer antennas. This type of terminal device may also be referred to as a lightweight (NR light, NRL) terminal device.

Bandwidth part (BWP): The 5G communication system may support a large bandwidth. For example, eMBB UE (or non-RedCap UE) may support a channel bandwidth of 100 MHz. A concept of BWP is introduced in the 5G standard for energy saving and other requirements, and the network device may configure a bandwidth of the BWP at a granularity of a resource block (RB). Because a bandwidth capability of the RedCap UE is limited (for example, a supported maximum channel bandwidth is small, for example, 20 MHz, but a maximum channel bandwidth supported by the non-RedCap UE is 100 MHz), a bandwidth, of the BWP, configured by the network device for the RedCap UE cannot exceed the capability of the RedCap UE, that is, does not exceed 20 MHz.

Because the UE is mobile, and a wireless channel environment is constantly changing, a status of a wireless channel between the UE and the network device is constantly changing. Therefore, after accessing a serving cell, the UE further needs to perform channel measurement of the serving cell and a neighboring cell based on a network configuration, and report a channel measurement result to the network device, so that the network device can better allocate a resource to the UE based on a channel status.

Radio resource management (RRM): may be used for mobility measurement, including measurement of a reference signal of the serving cell and measurement of a reference signal of the neighboring cell. According to a communication protocol, the network device may configure a plurality of measurement objects (MO) for the UE, and each MO may be associated with one reference signal used for measurement. The reference signal of the serving cell may be a cell-defined synchronization signal block (cell define synchronization signal block, CD-SSB). For one UE, one serving cell has only one CD-SSB but may have several NCD-SSBs. If a bandwidth of an active BWP (that is, a BWP on which information transmission is currently performed) does not include the CD-SSB, to measure channel quality of the serving cell, the UE can only perform frequency tuning and switch to a frequency domain resource on which the CD-SSB is located for measurement, and then return to the active BWP after the measurement.

Radio link monitoring (RLM) measurement or beam failure recovery (BFR) measurement: related only to measurement of the serving cell, that is, the CD-SSB is used for measurement.

If a network is deployed in a frequency range 1 (FR1), because a bandwidth capability of the terminal device is limited, although a bandwidth of the serving cell or a carrier may be 100 MHz, a maximum bandwidth of a BWP configured for the terminal device can only be 20 MHz. In this way, if an active BWP configured by the network device for the terminal device includes the CD-SSB, all terminal devices are concentrated in a 20 MHz frequency domain resource including the CD-SSB, causing frequency domain resource load imbalance. If an active BWP configured by the network device for the terminal device does not include the CD-SSB, the terminal device needs to switch, through frequency tuning, to a frequency domain resource on which the CD-SSB is located for measurement, and then returns to the active BWP after the measurement. Consequently, power consumption and complexity of the terminal device increase, and communication may be interrupted.

Therefore, how to improve communication performance of the terminal device and improve resource utilization of a communication system becomes an urgent technical problem to be resolved.

To resolve this problem, an embodiment of this application provides a communication method. In this method, a terminal device may receive measurement information from a network device, where the measurement information indicates one or more measurement objects, and the measurement information includes one or more of the following: information about a measurement object of a serving cell, information about intra-frequency measurement of a neighboring cell, and information about inter-frequency measurement of a neighboring cell; and the terminal device performs, based on a reference signal associated with one or more measurement objects corresponding to a first BWP, one or more of the following measurements: radio resource management RRM measurement, radio link monitoring RLM measurement, and beam failure recovery BFR measurement.

In this embodiment of this application, when performing measurement, the terminal device may perform measurement based on the reference signal associated with the one or more measurement objects corresponding to the first BWP. Because a measurement object indicated by the measurement information sent by the network device to the terminal device may be one or more of the following: the information about the measurement object of the serving cell, the information about the intra-frequency measurement of the neighboring cell, or the information about the inter-frequency measurement of the neighboring cell, this can avoid that all terminal devices are concentrated in a 20 MHz frequency domain resource of a CD-SSB, thereby balancing frequency domain resource load. The terminal device may perform measurement based on the reference signal associated with the one or more measurement objects corresponding to the first BWP, so that when the first BWP does not include the CD-SSB, the terminal device does not need to switch to a frequency domain resource on which the CD-SSB is located for measurement, and then switch to the first BWP. This can reduce power consumption and complexity of the terminal device, improve communication performance of the terminal device, and improve resource utilization of a communication system.

The following describes implementations of this embodiment of this application in detail with reference to accompanying drawings in this specification.

The communication method provided in this embodiment of this application may be applied to any communication system. The communication system may be a 3rd generation partnership project (3GPP) communication system, for example, an LTE communication system, may be a 5th generation (fifth generation, 5G) mobile communication system, a new radio (NR) communication system, or a new radio internet of vehicles (vehicle to everything, NR V2X) system, or may be applied to a system of LTE and 5G hybrid networking, or a device-to-device (D2D) communication system, a machine-to-machine (M2M) communication system, the internet of things (IoT) and another next-generation communication system, or may be a non-3GPP communication system. This is not limited.

The communication method provided in this embodiment of this application may be applied to various communication scenarios. For example, the communication method may be applied to one or more of the following communication scenarios: enhanced mobile broadband (eMBB), ultra-reliable and low latency communication (URLLC), machine type communication (MTC), massive machine type communication (mMTC), D2D, V2X, and IoT.

It should be noted that, in the specification, claims, and accompanying drawings of this application, the terms "first", "second", and the like are intended to distinguish between different objects but do not indicate a particular order. In addition, the terms "including" and "having" and any other variants thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

It should be understood that, in this application, "at least one (item)" means one or more, "a plurality of" means two or more, "at least two (items)" means two, three, or more, and "and/or" is used to describe an association relationship between associated objects, and indicates that there may be three relationships. For example, "A and/or B" may indicate that only A exists, only B exists, and both A and B exist, where A and B may be singular or plural. The character "/" generally indicates an "or" relationship between the associated objects. "At least one of the following items (pieces)" or a similar expression thereof refers to any combination of these items, including any combination of singular items (pieces) or plural items (pieces). For example, at least one of a, b, or c may indicate a, b, c, a and b, a and c, b and c, or a, b, and c, where a, b, and c may be singular or plural.

The following uses FIG. 1 as an example to describe the communication system provided in embodiments of this application.

FIG. 1 is a schematic diagram of a communication system according to an embodiment of this application. As shown in FIG. 1, the communication system may include a network device and a terminal device.

The terminal device in FIG. 1 may be located in a beam/cell coverage area of the network device. The terminal device may perform air interface communication with the network device by using an uplink (UL) or a downlink (DL). For example, the terminal device may send uplink data to the network device in an UL direction by using a physical uplink shared channel (PUSCH), and the network device may send downlink data to the terminal device in a DL direction by using a physical downlink shared channel (PDSCH). In addition, the network device and the terminal device may also communicate with each other by using a licensed spectrum, may communicate with each other by using an unlicensed spectrum, or may communicate with each other by using both a licensed spectrum and an unlicensed spectrum. The network device and the terminal device may communicate with each other by using a spectrum below 6G, may communicate with each other by using a spectrum above 6G, or may communicate with each other by using both a spectrum below 6G and a spectrum above 6G. A spectrum resource used between the network device and the terminal device is not limited in embodiments of this application.

The terminal device in FIG. 1 may be a terminal device that supports a new air interface, and may access a communication system through an air interface, and initiate a service such as a call or an internet access service. The terminal device may also be referred to as user equipment (UE), a mobile station (MS), a mobile terminal (MT), or the like. Specifically, the terminal device in FIG. 1 may be a mobile phone, a tablet computer, or a computer with a wireless transceiver function. Alternatively, the terminal may be a virtual reality (VR) terminal, an augmented reality (AR) terminal, a wireless terminal in industrial control, a wireless terminal in self-driving, a wireless terminal in telemedicine, a wireless terminal in a smart grid, a wireless terminal in a smart city, a wireless terminal in a smart home, a vehicle-mounted terminal, a vehicle having a vehicle-to-vehicle (, V2V) communication capability, an intelligent connected vehicle, an uncrewed aerial vehicle having a UAV-to-UAV (U2U) communication capability, or the like. This is not limited.

The network device in FIG. 1 may be any device having a wireless transceiver function, and is mainly configured to implement functions such as a wireless physical control function, resource scheduling and radio resource management, a radio access control and mobility management function, and provide a reliable wireless transmission protocol, a data encryption protocol, and the like.

The network device in FIG. 1 may be a device supporting wired access, or may be a device supporting wireless access. For example, the network device may be an access network (AN)/radio access network (RAN) device, where the AN/RAN device includes a plurality of 5G-AN/5G-RAN nodes. A 5G-AN/5G-RAN node may be an access point (AP), a NodeB (NB), an enhanced NodeB (eNB), a next-generation NodeB (NR NodeB, gNB), a transmission reception point (TRP), a transmission point (TP), another access node, or the like.

The network device and the terminal device may be deployed on land, including indoor or outdoor and handheld or vehicle-mounted devices, or may be deployed on the water, or may be deployed on an airplane, a balloon, or a satellite in the air. Application scenarios of the network device and the terminal device are not limited in embodiments of this application.

In addition, in FIG. 1, the communication system may further be a core network device, and the network device may be connected to the core network device in a wireless or wired manner.

The core network device may be configured to implement services such as user access control, mobility management, session management, user security authentication, and accounting.

Figure 2:
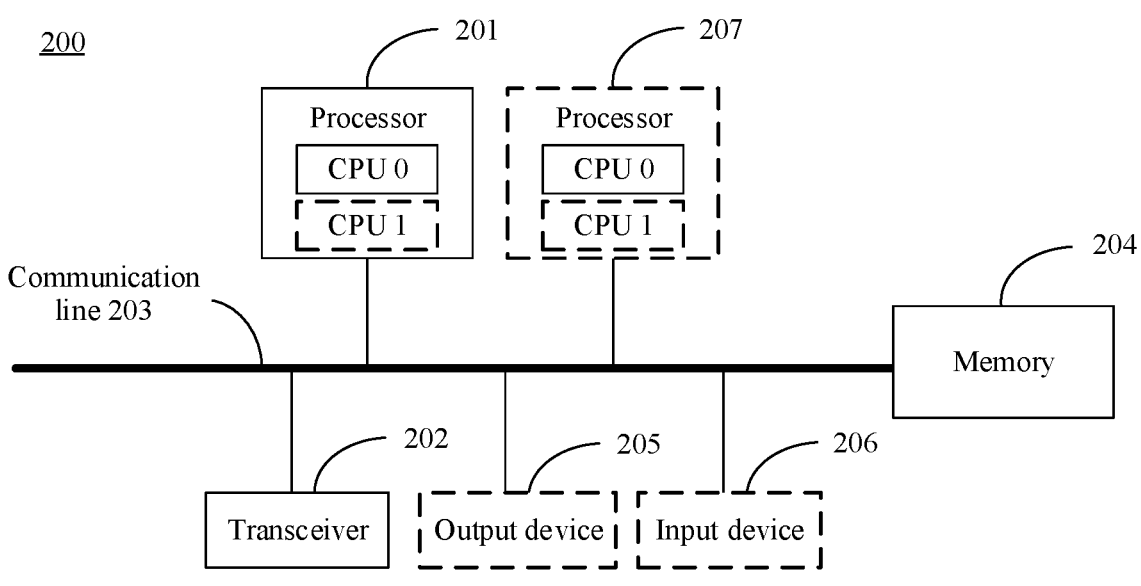
FIG. 2 is a diagram of a composition architecture of a communication apparatus according to an embodiment of this application.

During specific implementation, as shown in FIG. 1, each terminal device and each network device may use a composition structure shown in FIG. 2, or include components shown in FIG. 2. FIG. 2 is a schematic diagram of composition of a communication apparatus 200 according to an embodiment of this application. The communication apparatus 200 may be a terminal device, or a chip or a system-on-a-chip in the terminal device; or may be a network device, or a chip or a system-on-a-chip in the network device. As shown in FIG. 2, the communication apparatus 200 includes a processor 201, a transceiver 202, and a communication line 203.

Further, the communication apparatus 200 may further include a memory 204. The processor 201, the memory 204, and the transceiver 202 may be connected through the communication line 203.

The processor 201 is a central processing unit (CPU), a general-purpose processor, a network processor (NP), a digital signal processor (DSP), a microprocessor, a microcontroller, a programmable logic device (PLD), or any combination thereof. Alternatively, the processor 201 may be another apparatus having a processing function, for example, a circuit, a component, or a software module. This is not limited.

The transceiver 202 is configured to communicate with another device or another communication network. The another communication network may be an Ethernet, a radio access network (RAN), a wireless local area network (WLAN), or the like. The transceiver 202 may be a module, a circuit, a transceiver, or any apparatus that can implement communication.

The communication line 203 is configured to transmit information between the components included in the communication apparatus 200.

The memory 204 is configured to store instructions. The instruction may be a computer program.

The memory 204 may be a read-only memory (ROM) or another type of static storage device that can store static information and/or instructions, may be a random access memory (RAM) or another type of dynamic storage device that can store information and/or instructions, or may be an electrically erasable programmable read-only memory (EE-PROM), a compact disc read-only memory (CD-ROM) or another compact disc storage, an optical disc storage (including a compressed optical disc, a laser disc, an optical disc, a digital universal optical disc, a Blu-ray disc, or the like), a magnetic disk storage medium or another magnetic storage device, or the like. This is not limited.

It should be noted that the memory 204 may be independent of the processor 201, or may be integrated with the processor 201. The memory 204 may be configured to store instructions, program code, some data, or the like. The memory 204 may be located inside the communication apparatus 200, or may be located outside the communication apparatus 200. This is not limited. The processor 201 is configured to execute the instructions stored in the memory 204, to implement the communication method provided in the following embodiments of this application.

In an example, the processor 201 may include one or more CPUs, for example, a CPU 0 and a CPU 1 in FIG. 2.

In an optional implementation, the communication apparatus 200 includes a plurality of processors. For example, in addition to the processor 201 in FIG. 2, the communication apparatus 200 may further include a processor 207.

In an optional implementation, the communication apparatus 200 further includes an output device 205 and an input device 206. For example, the input device 206 is a device, for example, a keyboard, a mouse, a microphone, or a joystick, and the output device 205 is a device, for example, a display or a speaker.

It should be noted that the communication apparatus 200 may be a desktop computer, a portable computer, a network server, a mobile phone, a tablet computer, a wireless terminal, an embedded device, a chip system, or a device having a structure similar to a structure in FIG. 2. In addition, the composition structure shown in FIG. 2 does not constitute a limitation on the communication apparatus. In addition to the components shown in FIG. 2, the communication apparatus may include more or fewer components than components shown in the figure, combine some components, or have different component arrangements.

In embodiments of this application, the chip system may include a chip, or may include a chip and another discrete device.

In addition, for actions, terms, and the like in embodiments of this application, refer to each other. This is not limited. In embodiments of this application, names of messages exchanged between devices, names of parameters in the messages, or the like are merely examples. Another name may alternatively be used during specific implementation. This is not limited.

Figure 3:
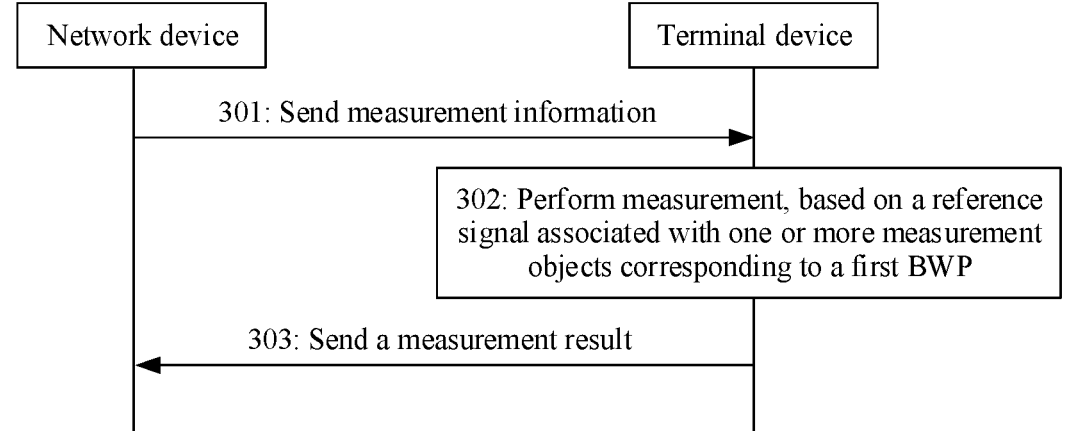
FIG. 3 is a flowchart of a communication method according to an embodiment of this application.

With reference to the communication system shown in FIG. 1, the following describes a communication method provided in an embodiment of this application with reference to FIG. 3. The terminal device may be any terminal device in the communication system shown in FIG. 1, and the network device may be any network device in the communication system shown in FIG. 1. The terminal device and the network device described in the following embodiment may have the components shown in FIG. 2. Processing performed by a single execution body (the terminal device or the network device) shown in the embodiments of this application may also be divided into processing processed by a plurality of execution bodies, and these execution bodies may be logically and/or physically separated. For example, processing performed by the network device may be divided into processing performed by at least one of a central unit (CU), a distribution unit (distributed unit, DU), and a radio unit (RU). This is not limited.

FIG. 3 is a flowchart of a communication method according to an embodiment of this application. As shown in FIG. 3, the method may include the following steps.

Step 301: A network device sends measurement information to a terminal device. Correspondingly, the terminal device receives the measurement information from the network device.

The measurement information may indicate one or more measurement objects. The measurement information may include one or more of the following: information about a measurement object of a serving cell, information about intra-frequency measurement of a neighboring cell, and information about inter-frequency measurement of a neighboring cell.

A reference signal associated with each measurement object may include one or more of the following: a CD-SSB, an NCD-SSB, and a channel-state information reference signal (CSI-RS). For example, the reference signal associated with the measurement object is a CD-SSB used for measurement of the serving cell. For example, the reference signal associated with the measurement object is an NCD-SSB used for measurement of the serving cell. For example, the reference signal associated with the measurement object is a CD-SSB used for measurement of the neighboring cell. For example, the reference signal associated with the measurement object is an NCD-SSB used for measurement of the neighboring cell.

For example, the measurement information may include identification information of the reference signal associated with the measurement object. For example, the identification information of the reference signal indicates that the reference signal is one or more of the following: a CD-SSB, an NCD-SSB, and a CSI-RS.

When the measurement information is the information about the intra-frequency measurement of the neighboring cell or the information about the inter-frequency measurement of the neighboring cell, whether the intra-frequency measurement or the inter-frequency measurement may be determined based on a frequency of the reference signal associated with the measurement object, and whether a reference signal of the neighboring cell is a CD-SSB or an NCD-SSB does not need to be concerned.

For example, a period of the NCD-SSB is greater than or equal to a period of the CD-SSB. The NCD-SSB is a reference signal used for measurement. A period of the NCD-SSB is configured by the network device. The CD-SSB is a reference signal used for measurement. A period of the CD-SSB is configured by the network device. In this way, the NCD-SSB used for measurement can be prevented from occupying excessive processing resources, and measurement load of the terminal device is not increased. This can also avoid that less resources are used for data transmission because occupied time-frequency resources of the network are excessive.

For example, to reduce measurement complexity of the terminal device, a maximum quantity of NCD-SSBs that can be included in a first resource may be limited. For example, the first resource is a carrier or a BWP. For example, there can be only one SSB in the first resource. A maximum quantity of NCD-SSBs included in the first resource is limited, so that measurement load of the terminal device caused by a large quantity of NCD-SSBs is not excessively heavy.

For example, a maximum quantity $N\_max$ of NCD-SSBs that can be configured by the network device for the terminal device in the first resource is limited. For example, a maximum quantity of NCD-SSBs supported by the terminal device in the first resource is limited. For example, the network device configures NCD-SSB information for the terminal device by using signaling. For example, the terminal device obtains, by receiving signaling, the NCD-SSB information configured by the network device for the terminal device. The NCD-SSB information includes one or more of frequency information about the NCD-SSB, information about a quantity of NCD-SSBs, or information about a maximum quantity of NCD-SSBs. The NCD-SSB information may be associated with the BWP, or the NCD-SSB information may be associated with the carrier. Alternatively, a maximum quantity of NCD-SSBs supported by the network device is limited.

For example, the maximum quantity of NCD-SSBs may be associated with a bandwidth of the first resource.

For example, the bandwidth of the first resource is 40 MHz, and $N\_max=1$ or 2. For example, the bandwidth of the first resource is 100 MHz, and $N\_max=4$ or 5. For example, the first resource is a BWP, and $N\_max=1$.

Optionally, a maximum quantity Ns of reference signals that can be included in the first resource is limited. For example, the first resource is a BWP, and the reference signal is a CD-SSB and/or an NCD-SSB. For example, $Ns=1$. For example, the BWP includes a maximum of one complete SSB. The SSB is used for measurement. The SSB may be a CD-SSB or an NCD-SSB.

Optionally, the NCD-SSB used for measurement may not include a master information block (MIB), or the NCD-SSB used for measurement may be used for reinterpretation, or may be used for data transmission.

In a possible design, a frequency of a reference signal associated with the intra-frequency measurement is the same as a frequency of a first reference signal. A frequency of the reference signal associated with the inter-frequency measurement is different from a frequency of a first reference signal. In this way, the terminal device needs to maintain intra-frequency measurement information of only one frequency at a same moment, thereby reducing power consumption and complexity of the terminal device.

The first reference signal may be a reference signal associated with a measurement object of a serving cell in a first BWP.

When the terminal device is in a connected mode, the first BWP is an active BWP. When the terminal device is in a non-connected mode, the first BWP is a BWP on which the terminal device camps.

In another possible design, a frequency of a reference signal associated with the intra-frequency measurement is the same as a frequency of a second reference signal. A frequency of the reference signal associated with the inter-frequency measurement is different from a frequency of a second reference signal. In this way, the terminal device simultaneously maintains all intra-frequency measurement information of frequencies associated with all measurement objects of the serving cell, so that the terminal device and the network device can better obtain channel quality of the terminal device on each bandwidth part (BWP) of the frequency domain resource, thereby providing more comprehensive reference information for the network device to perform scheduling.

The second reference signal is a reference signal associated with the measurement object of the serving cell of the terminal device. The second reference signal is a reference signal associated with any measurement object of the serving cell of the terminal device. For example, if the serving cell of the terminal device includes five measurement objects, any one of reference signals associated with the five measurement objects is considered as the second reference signal.

For example, the network device may configure one or more BWPs for the terminal device, and each BWP may correspond to one or more measurement objects.

A frequency domain resource of a reference signal associated with a measurement object corresponding to each BWP may be the same as a frequency domain resource of the BWP, or a frequency domain resource of a reference signal associated with a measurement object corresponding to each BWP falls within a frequency domain resource range of the BWP. For example, the frequency domain resource is a bandwidth.

For example, measurement objects configured by the network device for the terminal device include a first measurement object, a second measurement object, and a third measurement object, and BWPs configured by the network device for the terminal device include a BWP 1 and a BWP 2. The BWP 1 may correspond to the first measurement object, and the BWP 2 may correspond to the second measurement object and the third measurement object.

It should be noted that measurement objects corresponding to different BWPs may be the same or may be different.

For example, BWPs configured by the network device for the terminal device include a BWP 1, a BWP 2, and a BWP 3. Measurement objects corresponding to the BWP 1 and the BWP 2 may be different, and measurement objects corresponding to the BWP 1 and the BWP 3 may be the same.

In a first possible design, that the network device sends configuration information that carries the measurement information and that is of the BWP to the terminal device may also be described as that the measurement information is carried in the configuration information of the BWP.

The network device may send configuration information (for example, BWP-DownlinkDedicated) that carries measurement information corresponding to each BWP and that is of each BWP to the terminal device.

For example, BWPs configured by the network device for the terminal device include a BWP 1, a BWP 2, and a BWP 3. Configuration information of the BWP 1 may include measurement information corresponding to the BWP 1, and the measurement information corresponding to the BWP 1 may indicate one or more measurement objects corresponding to the BWP 1. Configuration information of the BWP 2 may include measurement information corresponding to the BWP 2, and the measurement information corresponding to the BWP 2 may indicate one or more measurement objects corresponding to the BWP 2. Configuration information of the BWP 3 may include measurement information corresponding to the BWP 3, and the measurement information corresponding to the BWP 3 may indicate one or more measurement objects corresponding to the BWP 3.

The measurement information may include one or more of the following: measurement object information, measurement object list information, and SSB information.

The measurement object information may include identification information of one or more measurement objects, and the identification information may be an MO ID or other identification information that may indicate a measurement object. The measurement object list information may include identification information of one or more measurement objects. A measurement object list may be an MO list or a MeasObjectToAddModList. The SSB information may include one or more of the following: frequency information of the SSB, a center frequency of the SSB, and an SSB index.

Optionally, when the measurement information includes the measurement object list information, the measurement object list information further includes an index of the measurement object list.

For BWPs corresponding to a same measurement object, indexes of measurement object lists included in measurement information of the BWPs corresponding to the same measurement object may be the same. For BWPs corresponding to different measurement objects, indexes of measurement object lists included in measurement information of the BWPs corresponding to the different measurement objects are different.

For example, BWPs configured by the network device for the terminal device include a BWP 1, a BWP 2, and a BWP 3. Assuming that measurement objects corresponding to the BWP 1 and the BWP 2 are different, and measurement objects corresponding to the BWP 1 and the BWP 3 are the same, indexes of measurement object lists corresponding to the BWP 1 and the BWP 2 are different, and indexes of measurement object lists corresponding to the BWP 1 and the BWP 3 are the same.

Alternatively, indexes of measurement object lists included in configuration information of different BWPs may be different.

For example, BWPs configured by the network device for the terminal device include a BWP 1, a BWP 2, and a BWP 3. An index of a measurement object list corresponding to the BWP 1 may be an index 1, an index of a measurement object list corresponding to the BWP 2 may be an index 2, and an index of a measurement object list corresponding to the BWP 3 may be an index 3.

It should be noted that when the configuration information, configured by the network device for the terminal device, of the BWP includes measurement information corresponding to the BWP, when the BWP is a first BWP, the terminal device may perform measurement based on measurement information corresponding to the first BWP. When the configuration information, configured by the network device for the terminal device, of the BWP does not include measurement information corresponding to the BWP, and the BWP is a first BWP, the terminal device may perform measurement based on a CD-SSB of the serving cell (that is, when the active BWP includes the CD-SSB of the serving cell, the terminal device performs measurement based on the CD-SSB of the serving cell; or when the active BWP does not include the CD-SSB of the serving cell, the terminal device switches to the CD-SSB of the serving cell for measurement, and then switches back to the active BWP).

For example, the measurement information may further include one or more of the following: identification information of a serving cell of the measurement object and identification information of a neighboring cell of the measurement object.

The network device indicates, in the measurement information, the identification information of the serving cell of the measurement object or the network device indicates, in the measurement information, the identification information of the neighboring cell of the measurement object, so that the terminal device can determine, based on the identification information of the cell of the measurement object, whether the current measurement object is the measurement object of the serving cell or the measurement object of the neighboring cell.

In a second possible design, the network device may send configuration information (for example, ServingCellConfig) that carries the measurement information and that is of the serving cell to the terminal device, or may be described as that the measurement information is carried in the configuration information of the serving cell.

The measurement information may include one or more of the following: measurement object information, information about one or more measurement object lists, and SSB information.

The measurement object information may include identification information of one or more measurement objects. The identification information may be an MO ID or other identification information that may indicate a measurement object. The measurement object list information may include identification information of one or more measurement objects. A measurement object list may be an MO list or a MeasObjectToAddModList. The SSB information may include one or more of the following: frequency information of the SSB and an SSB index.

For example, the network device may configure one or more measurement objects, and indicate, by using one measurement object list, the one or more measurement objects configured by the network device.

In this example, the terminal device may determine, by using a resource range of the BWP, a measurement object corresponding to the BWP.

For example, the resource range is a bandwidth.

A frequency domain resource of a reference signal associated with a measurement object corresponding to each BWP may be the same as a frequency domain resource of the BWP, or a frequency domain resource of a reference signal associated with a measurement object corresponding to each BWP falls within a frequency domain resource range of the BWP.

In still another example, the network device may configure, for each BWP, a measurement object corresponding to each BWP, and indicate, by using a plurality of measurement object lists, measurement objects configured by the network device for a plurality of BWPs.

In this example, the terminal device may determine, by using a resource range of the BWP, a measurement object corresponding to the BWP.

A frequency domain resource of a reference signal associated with a measurement object corresponding to each BWP may be the same as a frequency domain resource of the BWP, or a frequency domain resource of a reference signal associated with a measurement object corresponding to each BWP falls within a frequency domain resource range of the BWP.

Alternatively, when the measurement object list information further includes an index of the measurement object list, the terminal device may determine, by using the index corresponding to the BWP, a measurement object list corresponding to the BWP, to determine the measurement object corresponding to the BWP.

For BWPs corresponding to a same measurement object, indexes of measurement object lists corresponding to the BWPs corresponding to the same measurement object may be the same. For BWPs corresponding to different measurement objects, indexes of measurement object lists corresponding to the BWPs corresponding to the different measurement objects are different.

For example, BWPs configured by the network device for the terminal device include a BWP 1, a BWP 2, and a BWP 3. Assuming that measurement objects corresponding to the BWP 1 and the BWP 2 are different, and measurement objects corresponding to the BWP 1 and the BWP 3 are the same, indexes of measurement object lists corresponding to the BWP 1 and the BWP 2 are different, and indexes of measurement object lists corresponding to the BWP 1 and the BWP 3 are the same.

Alternatively, indexes of measurement object lists included in configuration information of different BWPs may be different.

For example, BWPs configured by the network device for the terminal device include a BWP 1, a BWP 2, and a BWP 3. An index of a measurement object list corresponding to the BWP 1 may be an index 1, an index of a measurement object list corresponding to the BWP 2 may be an index 2, and an index of a measurement object list corresponding to the BWP 3 may be an index 3.

For example, a quantity of measurement objects indicated by the measurement information may be less than or equal to a quantity of BWPs configured by the network device for the terminal device. Alternatively, a quantity of reference signals associated with the measurement object indicated by the measurement information may be less than or equal to a quantity of BWPs configured by the network device for the terminal device. For example, the reference signal is one or more of the following: an NCD-SSB, a CD-SSB, and a CSI-RS.

Figure 4:
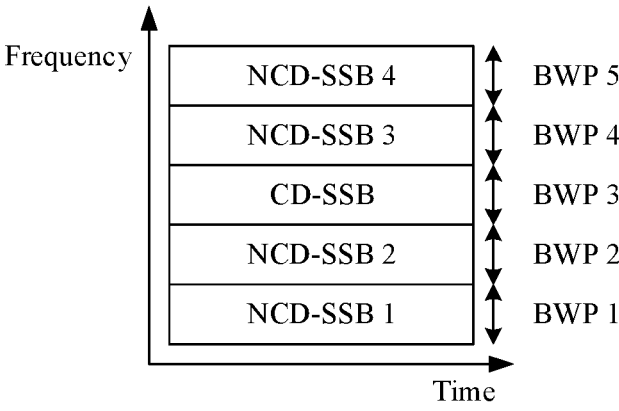
FIG. 4 is a schematic diagram of a configuration of an SSB according to an embodiment of this application.

For example, as shown in FIG. 4, that the measurement information included in the configuration information of the serving cell indicates five measurement objects is used as an example. It is assumed that the five measurement objects are respectively associated with five SSBs, and the five SSBs may be CD-SSBs or NCD-SSBs. The five SSBs may be respectively corresponding to different BWPs. For example, an NCD-SSB 1 corresponds to a BWP 1, an NCD-SSB 2 corresponds to a BWP 2, a CD-SSB corresponds to a BWP 3, an NCD-SSB 3 corresponds to a BWP 4, and an NCD-SSB 4 corresponds to a BWP 5.

Optionally, the network device may send first signaling to the terminal device, and the terminal device may perform measurement based on the first signaling.

The first signaling may indicate to perform measurement based on a reference signal associated with one or more measurement objects corresponding to the first BWP.

For example, the first signaling may be downlink control information (DCI) or media access control control element (media access control control unit, MAC CE) signaling. The network device uses dynamic signaling to indicate the measurement object information, so that the measurement configuration can be performed more flexibly based on a network status.

The DCI may indicate BWP switching.

The network device may send the first signaling to dynamically indicate the terminal device to perform measurement based on the one or more measurement objects corresponding to the first BWP. Alternatively, the network device may send the first signaling to dynamically indicate the terminal device to perform measurement based on the reference signal associated with the one or more measurement objects corresponding to the first BWP. Therefore, the network device can obtain a better channel status based on a measurement result reported by the terminal device.

It should be noted that when one BWP corresponds to a plurality of measurement objects, the terminal device may maintain a plurality of sets of measurements in one BWP. When one BWP corresponds to one measurement object, the terminal device may maintain one set of measurement in one BWP. When one BWP corresponds to one measurement object, the terminal device can be prevented from maintaining a plurality of sets of measurements in one BWP, and the terminal device can be prevented from occupying a large quantity of resources.

Optionally, first indication information sent by the terminal device is received. The network device receives the first indication information sent by the terminal device. Therefore, the network device can better configure an appropriate measurement resource for the terminal device based on a capability of the terminal device.

For example, the first indication information may indicate whether the terminal device supports RRM measurement, RLM measurement, beam-related measurement, or BFR measurement based on the NCD-SSB.

For example, the first indication information can indicate one or more of the following: { the terminal device supports the first resource to include the NCD-SSB;

the terminal device does not support the first resource to include the NCD-SSB;

the terminal device supports to perform one or more of the following based on the NCD-SSB: RRM measurement, RLM measurement, beam-related measurement, or BFR measurement;

the terminal device does not support to perform one or more of the following based on the NCD-SSB: RRM measurement, RLM measurement, beam-related measurement, or BFR measurement;

the terminal device supports to perform RRM measurement of the serving cell based on the NCD-SSB;

the terminal device does not support to perform RRM measurement of the serving cell based on the NCD-SSB;

the terminal device supports to perform RRM measurement of a non-serving cell (or a neighboring cell) based on the NCD-SSB;

the terminal device does not support to perform RRM measurement of a non-serving cell (or a neighboring cell) based on the NCD-SSB;

the terminal device supports quasi co-location QCL of the NCD-SSB and the CD-SSB;

the terminal device supports non-quasi co-location of the NCD-SSB and the CD-SSB;

the terminal device supports a PCI of the NCD-SSB to be different from a PCI of the CD-SSB;

the terminal device supports a PCI of the NCD-SSB to be the same as a PCI of the CD-SSB;

the terminal device supports CD-SSB measurement by using a measurement gap;

the terminal device does not support CD-SSB measurement by using a measurement gap;

the terminal device supports a period of the NCD-SSB to be different from a period of the CD-SSB;

the terminal device supports a period of the NCD-SSB to be the same as a period of the CD-SSB;

the terminal device supports transmit power of the NCD-SSB to be different from transmit power of the CD-SSB;

the terminal device supports transmit power of the NCD-SSB to be the same as transmit power of the CD-SSB;

a quantity of NCD-SSBs supported by the terminal device on one carrier;

a quantity of NCD-SSBs that can be measured by the terminal device on one carrier;

a quantity of NCD-SSBs supported by the terminal device in one BWP; and a quantity of NCD-SSBs that can be measured by the terminal device in one BWP.

}

For example, the first resource is a BWP or a carrier.

For example, the first indication information indicates one or more of the following: the terminal device supports the first resource not to include the SSB and/or a CORESET #0; and the terminal device supports the first resource to include the NCD-SSB.

For example, the first indication information is one bit. If a bit state of the first indication information is 0, the first indication information indicates that the terminal device supports the first resource not to include the SSB and/or the CORESET #0. If a bit state of the first indication information is 1, the first indication information indicates that the terminal device supports the first resource to include the NCD-SSB. Alternatively, if a bit state of the first indication information is 1, the first indication information indicates that the terminal device supports the first resource not to include the SSB and/or the CORESET #0. Alternatively, if a bit state of the first indication information is 0, the first indication information indicates that the terminal device supports the first resource to include the NCD-SSB.

If the terminal device supports the RRM measurement, the RLM measurement, the beam-related measurement, or the BFR measurement based on the NCD-SSB, when configuring a measurement object for the terminal device, the network device may configure the measurement object associated with the NCD-SSB.

Optionally, the network device may further receive second indication information sent by the terminal device, where the second indication information may indicate a maximum quantity of frequencies supported by the terminal device. For example, the frequency is a frequency or a center frequency of a measured reference signal. For example, the measurement is intra-frequency measurement and/or inter-frequency measurement.

For example, the maximum value may be greater than or equal to 8. For example, the maximum value may be 8, 10, 12, 14, 16, or the like.

It should be noted that a sum of quantities of frequencies corresponding to the intra-frequency measurement and the inter-frequency measurement that are supported by the terminal device may be greater than 8.

A quantity of frequencies supported by the terminal device in a first measurement period may be less than or equal to 8. Frequencies supported by the terminal device in different first measurement periods may be the same or may be different. The first measurement period is a minimum value among measurement periods corresponding to the one or more measurement objects.

For example, the first measurement period includes a first measurement period 1, a first measurement period 2, and a first measurement period 3. A frequency supported by the terminal device in the first measurement period 1 may be the same as a frequency supported in the first measurement period 2, and a frequency supported by the terminal device in the first measurement period 1 may be different from a frequency supported in the first measurement period 3.

A total quantity of frequencies corresponding to the intra-frequency measurement and the inter-frequency measurement that are supported by the terminal device is increased, so that after the NCD-SSB is introduced, network service quality is not affected due to a limited quantity of frequencies for measurement, or measurement load of the terminal device is not excessively heavy.

Optionally, when the network device indicates the SSB to the terminal device, measurement filtering and reporting of the CD-SSB and measurement filtering and reporting of the NCD-SSB may be different. The network device may indicate, to the terminal device, whether the SSB is a CD-SSB or an NCD-SSB.

The network device may indicate, to the terminal device by using configuration information, whether the SSB is the CD-SSB or the NCD-SSB. For example, the configuration information is one or more of the following: RRC configuration information, configuration information of a serving cell, and BWP configuration information.

For example, a first parameter of the NCD-SSB is configured the same as a first parameter of the CD-SSB. For example, the first parameter is at least one of the following: a subcarrier spacing, transmit power, and a reference signal index. For example, the transmit power is at least one of the following: primary synchronization signal transmit power and secondary synchronization signal transmit power. For example, the reference signal index is an index bitmap. For example, the reference signal index indicates time domain information of a reference signal sent by the network device. For example, the index includes a quantity of 8 bits, and a bitmap 10001000 indicates that a $0^{th}$ reference signal and a $4^{th}$ reference signal are sent or used for measurement. Specifically, for example, the configuration information of the NCD-SSB does not include the first parameter. For example, the terminal device determines first parameter information of the NCD-SSB based on first parameter information of the CD-SSB.

For example, the reference signal for measurement of the neighboring cell includes at least the CD-SSB, or the reference signal for measurement of the neighboring cell can only be the CD-SSB. During neighboring cell selection, if there are a plurality of reference signals, and measurement reference values are different, determined channel quality of the neighboring cell may be different, and consequently the selected neighboring cell is not an optimal neighboring cell. Therefore, the CD-SSB is selected as the reference signal of the neighboring cell as much as possible or the reference signal of the neighboring cell includes at least the CD-SSB.

Step 302: The terminal device performs measurement based on the reference signal associated with the one or more measurement objects corresponding to the first BWP.

Optionally, when the terminal device is in a connected mode, the first BWP may be an active BWP. Alternatively, when the terminal device is in a non-connected mode, the first BWP may be a BWP on which the terminal device camps.

The measurement may include one or more of the following measurements: RRM measurement, RLM measurement, BFR measurement, beam measurement, and beam failure detection BFD measurement.

It should be noted that, when the measurement is the RRM measurement, the measurement information may be the measurement information described in the foregoing step 301. When the measurement is the RLM measurement, the BFR measurement, beam measurement, or the beam failure detection BFD measurement, the measurement information may include the SSB information. The measurement information may be carried in the configuration information of the BWP, or may be carried in downlink frequency information (FrequencyInfoDL).

When the measurement information is carried in the configuration information of the BWP, the terminal device may determine, based on the configuration information of the first BWP, the one or more measurement objects corresponding to the first BWP. When the measurement information is carried in the configuration information of the serving cell, the terminal device may determine, based on the frequency domain resource of the first BWP, the one or more measurement objects corresponding to the first BWP.

For example, a frequency domain resource of a reference signal associated with the measurement object corresponding to the first BWP may be the same as a frequency domain resource of the first BWP; or a frequency domain resource of a reference signal associated with the measurement object corresponding to the first BWP falls within a frequency domain resource range of the first BWP.

Optionally, when the first BWP corresponds to a plurality of measurement objects, the terminal device may select, from the plurality of measurement objects corresponding to the first BWP, one measurement object for measurement, so that power consumption of the terminal device can be reduced.

For example, the terminal device may select, from the plurality of measurement objects corresponding to the first BWP, a predefined measurement object for measurement. Alternatively, the terminal device may select, from the plurality of measurement objects corresponding to the first BWP, a measurement object associated with the CD-SSB for measurement. Alternatively, the terminal device may select, from the plurality of measurement objects corresponding to the first BWP, a measurement object with a smallest index for measurement. Alternatively, the terminal device may select, from the plurality of measurement objects corresponding to the first BWP, a measurement object corresponding to a reference signal whose frequency is closest to a center frequency of the first BWP for measurement.

Optionally, when performing measurement, the terminal device may measure the measurement object corresponding to the first BWP, or may measure a measurement object corresponding to each BWP.

Optionally, when a frequency of a reference signal associated with the intra-frequency measurement is the same as a frequency of a reference signal associated with a measurement object of a serving cell in the first BWP, the terminal device may not measure a second measurement object. A frequency of a reference signal of the second measurement object is different from the frequency of the reference signal associated with the measurement object of the serving cell in the first BWP.

Step 303: The terminal device sends a measurement result to the network device. Correspondingly, the network device receives the measurement result from the terminal device.

Based on the method shown in FIG. 3, when performing measurement, the terminal device may perform measurement based on the reference signal associated with the one or more measurement objects corresponding to the first BWP. Because a measurement object indicated by the measurement information sent by the network device to the terminal device may be one or more of the following: the information about the measurement object of the serving cell, the information about the intra-frequency measurement of the neighboring cell, or the information about the inter-frequency measurement of the neighboring cell, this can avoid that all terminal devices are concentrated in a 20 MHz frequency domain resource of a CD-SSB, thereby balancing frequency domain resource load. The terminal device may perform measurement based on the reference signal associated with the one or more measurement objects corresponding to the first BWP, so that when the first BWP does not include the CD-SSB, the terminal device does not need to switch to a frequency domain resource on which the CD-SSB is located for measurement, and then switch to the first BWP. This can reduce power consumption and complexity of the terminal device, improve communication performance of the terminal device, and improve resource utilization of a communication system. In addition, measurement performed by using a measurement object associated with the NCD-SSB is introduced, and how the terminal device determines the measurement object and the reference signal is specified, so that a case in which measurement information needs to be frequently reconfigured can be avoided.

For example, the measurement report information includes cell identification information. For example, a cell identifier is a physical cell identifier. For example, the cell identification information indicates a serving cell or a neighboring cell. For example, the cell identification information is 1 bit. For example, if a bit state of the cell identification information is 0, the cell identification information indicates that reporting information is the serving cell. For example, if a bit state of the cell identification information is 1, the cell identification information indicates that reporting information is the neighboring cell.

When one cell or one carrier has a plurality of SSBs at different frequencies, and two of the plurality of SSBs at different frequencies may have a same cell identity. Therefore, the measurement report information may further include feature information, where the feature information is used to identify or distinguish SSBs that have a same cell identity and that have different frequencies. For example, one cell or one carrier has X SSBs at different frequencies. Types of the X SSBs at the different frequencies may be completely the same, or may be not exactly the same. For example, one of the X SSBs at the different frequencies is a CD-SSB, and the other X-1 SSBs are NCD-SSBs. The X SSBs at the different frequencies are denoted as SSB 1, SSB 2, ..., and SSB (X-1). X is a positive integer. An SSBn and an SSBm have a same cell identity. Measurement reporting information of the SSBn reported by the UE may include a cell identity and feature information. Measurement reporting information of the SSBm reported by the UE may also include a cell identity and feature information. The network device cannot determine, based on the cell identity in the measurement reporting information, whether a measurement report is associated with the SSBn or the SSBm. However, the network device can determine, based on the cell identity and the feature information, whether the measurement report is associated with the SSBn or the SSBm. In this way, this avoids that the network device cannot identify a source of the measurement reporting information, thereby improving utilization of the measurement information and avoiding reporting of invalid measurement information by the user equipment.

In this embodiment of this application, the feature information may be one or more of the following: BWP information, reference signal information, and cell identification information. For example, the BWP information is at least one of the following: BWP index information, BWP resource location information, BWP center frequency information, subcarrier spacing information of the BWP, time information of the BWP, and frequency information of the BWP. For example, the reference signal information is at least one of the following: center frequency information of the reference signal, index information of the reference signal, resource location information of the reference signal, subcarrier spacing information of the reference signal, time information of the reference signal, and frequency information of the reference signal. For example, the reference signal may be an SSB. For example, a type of the SSB may be CD-SSB. For example, a type of the SSB may be NCD-SSB.

If the measurement reporting information includes only cell index information (for example, a physical cell index), and the measurement reporting result of the serving cell includes reporting information corresponding to a plurality of measurement reference signals or measurement objects, the reporting information needs to include reference signal information, BWP information, cell identification information, and the like corresponding to the reported measurement result. Therefore, the network device can better determine, based on the information, channel quality of the terminal device on frequency domain resources corresponding to different reference signals, to better serve the terminal device.

The foregoing mainly describes the solutions provided in embodiments of this application from a perspective of interaction between the devices. It may be understood that to implement the foregoing functions, the devices include hardware structures and/or software modules corresponding to the functions. A person of ordinary skill in the art should easily be aware that, in combination with algorithms and steps in the examples described in embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, functional modules of each device may be obtained through division according to the foregoing method example. For example, the functional modules may be obtained through division corresponding to various functions, or two or more functions may be integrated into one processing module. The integrated module may be implemented in a form of hardware, or may be implemented in a form of a software functional module. It should be noted that, in embodiments of this application, module division is an example, and is merely a logical function division. In actual implementation, another division manner may be used.

Figure 5:
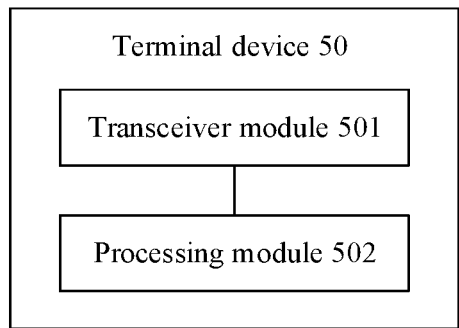
FIG. 5 is a schematic diagram of composition of a terminal device according to an embodiment of this application.

When each function module is obtained through division based on each corresponding function, FIG. 5 shows a terminal device. The terminal device 50 may include a transceiver module 501 and a processing module 502. For example, the terminal device 50 may be a terminal device, or may be a chip used in the terminal device or another combined device or component that has a function of the terminal device. When the terminal device 50 is the terminal device, the transceiver module 501 may be a transceiver, where the transceiver may include an antenna, a radio frequency circuit, and the like; and the processing module 502 may be a processor (or a processing circuit), for example, a baseband processor, where the baseband processor may include one or more CPUs. When the terminal device 50 is the component that has the function of the terminal device, the transceiver module 501 may be a radio frequency unit; and the processing module 502 may be a processor (or a processing circuit), for example, a baseband processor. When the terminal device 50 is a chip system, the transceiver module 501 may be an input/output interface of a chip (for example, a baseband chip); and the processing module 502 may be a processor (or a processing circuit) of the chip system or a logic circuit, and may include one or more central processing units. It should be understood that the transceiver module 501 in this embodiment of this application may be implemented by a transceiver or a transceiver-related circuit component; and the processing module 502 may be implemented by a processor or a processor-related circuit component (or referred to as a processing circuit).

For example, the transceiver module 501 may be configured to perform all sending and receiving operations performed by the terminal device in the embodiments shown in FIG. 3 and FIG. 4, and/or configured to support another process of the technology described in this specification. The processing module 502 may be configured to perform all operations other than sending and receiving operations performed by the terminal device in the embodiments shown in FIG. 3 and FIG. 4, and/or configured to support another process of the technology described in this specification.

The transceiver module 501 may be configured to receive measurement information from a network device, where the measurement information indicates one or more measurement objects, and the measurement information includes one or more of the following: information about a measurement object of a serving cell, information about intra-frequency measurement of a neighboring cell, and information about inter-frequency measurement of a neighboring cell.

The processing module 502 may be configured to perform, based on a reference signal associated with one or more measurement objects corresponding to a first bandwidth part BWP, one or more of the following measurements: radio resource management RRM measurement, radio link monitoring RLM measurement, and beam failure recovery BFR measurement.

In still another possible implementation, the transceiver module 501 in FIG. 5 may be replaced with a transceiver, functions of the transceiver module 501 may be integrated into the transceiver, the processing module 502 may be replaced with a processor, and a function of the processing module 502 may be integrated into the processor. Further, the terminal device 50 shown in FIG. 5 may further include a memory. When the transceiver module 501 is replaced with a transceiver and the processing module 502 is replaced with a processor, the terminal device 50 in this embodiment of this application may be the communication apparatus shown in FIG. 2.

Figure 7:
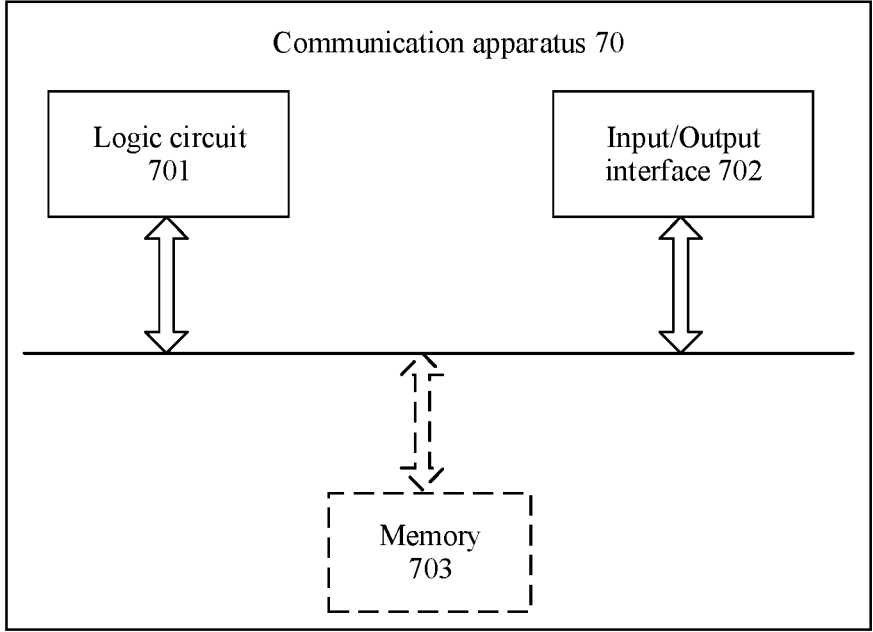
FIG. 7 is a schematic diagram of composition of a communication apparatus according to an embodiment of this application.

Alternatively, when the transceiver module 501 is replaced with a transceiver, and the processing module 502 is replaced with a processor, the terminal device 50 in this embodiment of this application may alternatively be the communication apparatus 70 shown in FIG. 7. The processor may be a logic circuit 701, and the transceiver may be an input/output interface 702. Further, the communication apparatus 70 shown in FIG. 7 may further include a memory 703.

Figure 6:
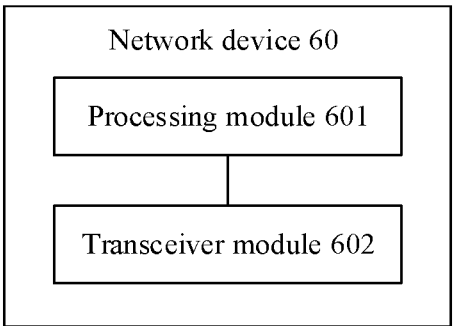
FIG. 6 is a schematic diagram of composition of a network device according to an embodiment of this application.

When each function module is obtained through division based on each corresponding function, FIG. 6 shows a network device. The network device 60 may include a processing module 601 and a transceiver module 602. For example, the network device 60 may be a network device, or may be a chip used in the network device or another combined device or component that has a function of the network device. When the network device 60 is the network device, the processing module 601 may be a processor (or a processing circuit), for example, a baseband processor, where the baseband processor may include one or more CPUs; and the transceiver module 602 may be a transceiver, where the transceiver may include an antenna, a radio frequency circuit, and the like. When the network device 60 is the component that has the function of the network device, the processing module 601 may be a processor (or a processing circuit), for example, a baseband processor; and the transceiver module 602 may be a radio frequency unit. When the network device 60 is a chip system, the processing module 601 may be a processor (or a processing circuit) of the chip system, or a logic circuit, and may include one or more central processing modules; and the transceiver module 602 may be an input/output interface of a chip (for example, a baseband chip). It should be understood that the processing module 601 in this embodiment of this application may be implemented by a processor or a processor-related circuit component (or referred to as a processing circuit); and the transceiver module 602 may be implemented by a transceiver or a transceiver-related circuit component.

For example, the processing module 601 may be configured to perform all operations other than receiving and sending operations performed by the network device in the embodiments shown in FIG. 3 and FIG. 4, and/or configured to support another process of the technology described in this specification. The transceiver module 602 may be configured to perform all receiving and sending operations performed by the network device in the embodiments shown in FIG. 3 and FIG. 4, and/or configured to support another process of the technology described in this specification.

The processing module 601 is configured to determine measurement information.

The transceiver module 602 is configured to send measurement information to a terminal device, where the measurement information indicates one or more measurement objects, and the measurement information includes one or more of the following: information about a measurement object of a serving cell, information about intra-frequency measurement of a neighboring cell, and information about inter-frequency measurement of a neighboring cell.

The transceiver module 602 is further configured to receive a measurement result from the terminal device, where the measurement result is a measurement result obtained by the terminal device by performing one or more of the following measurements based on a reference signal associated with one or more measurement objects corresponding to a first bandwidth part BWP: radio resource management RRM measurement, radio link monitoring RLM measurement, and beam failure recovery BFR measurement.

In still another possible implementation, the processing module 601 in FIG. 6 may be replaced with a processor, and functions of the processing module 601 may be integrated into the processor. The transceiver module 602 may be replaced with a transceiver, and functions of the transceiver module 602 may be integrated into the transceiver. Further, the network device 60 shown in FIG. 6 may further include a memory. When the processing module 601 is replaced by a processor, and the transceiver module 602 is replaced by a transceiver, the network device 60 in this embodiment of this application may be the communication apparatus shown in FIG. 2.

Alternatively, when the processing module 601 is replaced with a processor, and the transceiver module 602 is replaced with a transceiver, the network device 60 in this embodiment of this application may alternatively be the communication apparatus 70 shown in FIG. 7. The processor may be a logic circuit 701, and the transceiver may be an input/output interface 702. Further, the communication apparatus 70 shown in FIG. 7 may further include a memory 703.

Embodiments of this application further provide a computer-readable storage medium. All or some of the processes in the foregoing method embodiments may be implemented by a computer program instructing related hardware. The program may be stored in the computer-readable storage medium. When the program is executed, the processes of the foregoing method embodiments may be included. The computer-readable storage medium may be an internal storage unit of the terminal (including a data transmit end and/or a data receive end) in any one of the foregoing embodiments, for example, a hard disk drive or a memory of the terminal. Alternatively, the computer-readable storage medium may be an external storage device of the terminal, for example, a plug-in hard disk, a smart media card (SMC), a secure digital (SD) card, a flash card, or the like that are configured on the terminal. Further, the computer-readable storage medium may alternatively include both of the internal storage unit of the terminal and the external storage device. The computer-readable storage medium is configured to store the computer program and other programs and data that are required by the terminal. The computer-readable storage medium may be further configured to temporarily store data that has been output or is to be output.

The foregoing descriptions about implementations allow a person skilled in the art to understand that, for the purpose of convenient and brief description, division of the foregoing functional modules is taken as an example for illustration. In actual application, the foregoing functions can be allocated to different modules and implemented according to a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, the module or division into the units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such understanding, the technical solutions of this application essentially or all or some of the technical solutions may be implemented in the form of a software product. The software product is stored in a storage medium and includes several instructions for instructing a device (which may be a single-chip microcomputer, a chip or the like) or a processor to perform all or some of the steps of the methods described in embodiments of this application. The foregoing storage medium includes any medium that can store program code, such as a USB flash drive, a removable hard disk, a ROM, a RAM, a magnetic disk, or an optical disc.

What is claimed is:

1. A communication method, performed by a terminal device or a chip of the terminal device, the method comprising:

receiving measurement information comprised in BWP-DownlinkDedicated that is configuration information of a first bandwidth part (BWP) from a network device, wherein the measurement information indicates a measurement object of a serving cell, and the measurement information comprises identification information of the measurement object of the serving cell; and performing, based on a non-cell-defined synchronization signal block (NCD-SSB) associated with the measurement object corresponding to the first BWP, at least one measurement taken from the group of measurement types consisting of:

a radio resource management (RRM) measurement, a radio link monitoring (RLM) measurement, and a beam failure detection (BFD) measurement.

2. The method according to claim 1, wherein based on the terminal device being in a connected mode, the first BWP is an active BWP.

3. The method according to claim 1, wherein a frequency domain resource of the NCD-SSB falls within a frequency domain resource range of the first BWP.

4. The method according to claim 1, wherein a measurement period of an NCD-SSB of the serving cell is greater than or equal to a measurement period of a cell-defined synchronization signal block (CD-SSB) of the serving cell.

5. The method according to claim 1, wherein a maximum quantity of NCD-SSBs comprised in the first BWP is 1.

6. The method according to claim 1, wherein the terminal device is reduced capability user equipment (RedCap UE).

7. The method according to claim 1, wherein the measurement information comprises information about intra-frequency measurement of a neighboring cell, and/or information about inter-frequency measurement of a neighboring cell.

8. The method according to claim 7, further comprising:

determining the information about the intra-frequency measurement of the neighboring cell based on the measurement information, wherein a frequency of a reference signal associated with the intra-frequency measurement is the same as a frequency of a first reference signal, and the first reference signal is a reference signal associated with the measurement object of the serving cell in the first BWP, wherein the reference signal comprises one or more of components taken from the group consisting of a cell-defined synchronization signal block (CD-SSB), an NCD-SSB, and a channel state information (CSI-RS).

9. The method according to claim 1, wherein the measurement information further comprises a center frequency of the NCD-SSB.

10. A communication method comprising:

sending, by a network device, measurement information to a terminal device, wherein the measurement information indicates one or more measurement objects, and the measurement information comprises one or more of the following: information about a measurement object of a serving cell, information about intra-frequency measurement of a neighboring cell, and information about inter-frequency measurement of a neighboring cell; and receiving, by the network device, a measurement result from the terminal device, wherein the measurement result is obtained by the terminal device by performing one or more of the following measurements based on a reference signal: radio resource management (RRM) measurement, radio link monitoring (RLM) measurement, and beam failure detection (BFD) measurement; wherein the reference signal is associated with one or more measurement objects corresponding to a first bandwidth part (BWP).

11. The method according to claim 10, wherein based on the terminal device being in a connected mode, the first BWP is an active BWP.

12. The method according to claim 10, wherein a frequency domain resource of the NCD-SSB falls within a frequency domain resource range of the first BWP.

13. The method according to claim 10, wherein a measurement period of an NCD-SSB of the serving cell is greater than or equal to a measurement period of a cell-defined synchronization signal block (CD-SSB) of the serving cell.

14. The method according to claim 10, wherein a maximum quantity of NCD-SSBs comprised in the first BWP is 1.

15. The method according to claim 10, wherein the measurement information comprises information about intra-frequency measurement of a neighboring cell, and/or information about inter-frequency measurement of a neighboring cell.

16. The method according to claim 15, further comprising:

a frequency of a reference signal associated with the intra-frequency measurement is the same as a frequency of a first reference signal, and the first reference signal is a reference signal associated with the measurement object of the serving cell in the first BWP, wherein the reference signal comprises one or more of components taken from the group consisting of a cell-defined synchronization signal block (CD-SSB), an NCD-SSB, and a channel state information (CSI-RS).

17. The method according to claim 10, wherein the measurement information further comprises a center frequency of the NCD-SSB.

18. An apparatus comprising:

one or more processors; and one or more memories coupled to the one or more processors and storing programming instructions for execution by the one or more processors to cause the apparatus to perform the following:

receiving measurement information comprised in BWP-DownlinkDedicated that is configuration information of a first bandwidth part (BWP) from a network device, wherein the measurement information indicates a measurement object of a serving cell, and the measurement information comprises identification information of the measurement object of the serving cell; and performing, based on a non-cell-defined synchronization signal block (NCD-SSB) associated with the measurement object corresponding to the first BWP at least one measurement taken from the group of measurement types consisting of:

a radio resource management (RRM) measurement, a radio link monitoring (RLM) measurement, and a beam failure detection (BFD) measurement.

19. The apparatus according to claim 18, wherein based on the apparatus being in a connected mode, the first BWP is an active BWP.

20. The apparatus according to claim 18, wherein the measurement information comprises information about intra-frequency measurement of a neighboring cell, and/or information about inter-frequency measurement of a neighboring cell.

21. The apparatus according to claim 18, wherein the measurement information further comprises a center frequency of the NCD-SSB.

* * * * *